United States Patent [19]
Amada

[11] 3,762,746
[45] Oct. 2, 1973

[54] PIPE CONNECTION WITH REINFORCED SEAL

[75] Inventor: Taro Amada, Ota-ku, Tokyo, Japan

[73] Assignee: Yamamoto Sangyo Kabushiki Kaisha, Osaki-shi, Japan

[22] Filed: Sept. 8, 1971

[21] Appl. No.: 178,617

[30] Foreign Application Priority Data
Sept. 18, 1970 Japan.............................. 45/81212

[52] U.S. Cl............ 285/184, 24/262 R, 277/235 R, 285/367, 285/DIG. 11
[51] Int. Cl............................................. F16l 27/00
[58] Field of Search.................... 24/262 R, 263 DD; 285/365, 366, 367, 407, 408, 409, 410, 411, 328, 104, 105, 184, DIG. 11; 277/9, 235 R

[56] References Cited
UNITED STATES PATENTS

| | | | |
|---|---|---|---|
| 2,747,899 | 5/1956 | Wiltse | 285/DIG. 11 |
| 3,169,025 | 2/1965 | Borah | 285/DIG. 11 |
| 2,463,235 | 3/1949 | Andrews | 285/105 |
| 2,460,981 | 2/1949 | Francisco et al. | 285/367 X |

FOREIGN PATENTS OR APPLICATIONS

| | | | |
|---|---|---|---|
| 152,062 | 11/1882 | France | 285/184 |
| 822,019 | 9/1937 | France | 285/367 |

Primary Examiner—Dave W. Arola
Attorney—Harold D. Steinberg et al.

[57] ABSTRACT

A piping line having sections solidly connected at any desired angle by means of connecting two semispherical couplings with slanted surfaces at 45° to a sphere in respective slant surface, and fastening the couplings to each other with a fastener assembly which has a sealing ring reinforced with steel balls.

1 Claim, 5 Drawing Figures

PATENTED OCT 2 1973    3,762,746

INVENTOR.
TARO AMADA
BY Steinberg & Blake
attys

PIPE CONNECTION WITH REINFORCED SEAL

SUMMARY OF THE INVENTION

This invention relates to a pipe connecting device and its main object is to install piping quickly and easily and also to decrease piping cost to a great extent.

DETAILED DESCRIPTION OF THE INVENTION:

This invention relates to piping connection. Conventionally, two pipes to be connected together in connecting work of pipes in a various kind of piping works are connected by interposing a few similar pipes or fixing it at a proper position or bending, in which case a position or angle at each position differs from its original design, or a considerable error causes between it and pipe extended from a different direction, then both pipes are impossible to be connected together. It is required to perform a repair or correction work for a fixed or bent portion to fulfil this piping work and this unproductive work of such correction used to cause in a piping work of such kind, for which a great deal of useless troubles and time were required.

The invention provides a pipe connecting system which requires no correction work at all that could be seen in a conventional connecting method, and its main principle is such that pipe lines can be connected firmly at any desired angle by connecting two semi-spherical couplings respectively with slanted surfaces at 45° to a spherical element in respective slant surface.

Figure 1:
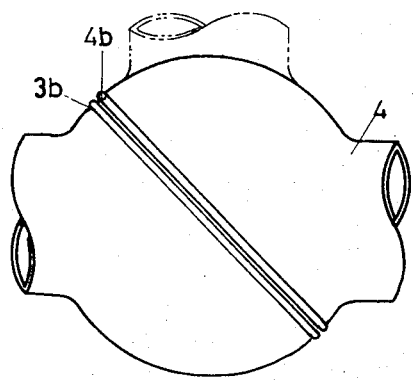
FIG. 1 is an illustrative view showing the principle of the invention.
Figure 2:
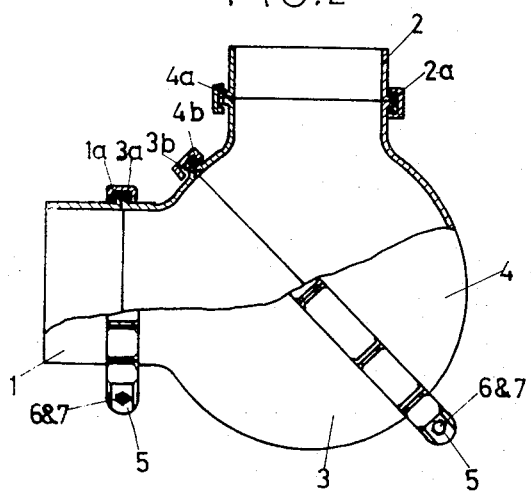
FIG. 2 is a front view showing an embodiment of the present invention.

Referring now to the figures, in FIG. 2 there are fixed respectively with two flanges 1a and 2a on the extreme ends of two pipes 1 and 2 extending at 90°, to which the horizontal or vertical flanges 3a and 4a of a pair of hemispherical pipe couplings 3 and 4 with 45° slanted surfaces are positioned opposedly, and also flanges 3b and 4b on the 45° slanted outside circumferences of these semi-spherical couplings 3 and 4 are positioned opposedly and these 3 opposedly positioned flanges are clipped with the same number of fastener means in the form of channel-shaped bands 5. At both ends of each fastener band 5 are provided projection 5a and groove 5b to fix both-side flanges together, with fastener bolt 6 entering into bolt holes provided at both ends of these clamping bands and tightened with nuts 7, thus connecting firmly a pair of semi-spherical couplings 3 and 4 to said pipes 1 and 2.

Figure 5:
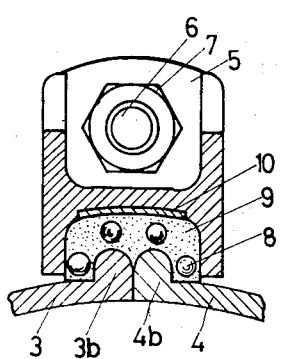
FIG. 5 shows a fragmentary sectional view of a portion of a fastener and its packing.
Figure 3:
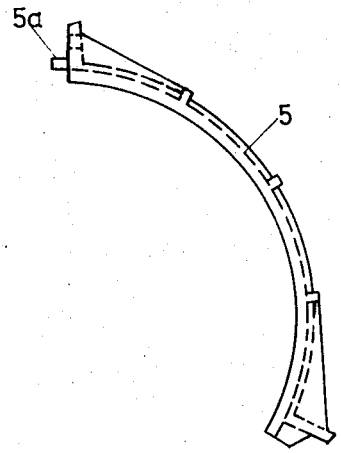
FIG. 3 is a front view of a fastener which is used in this embodiment.
Figure 4:
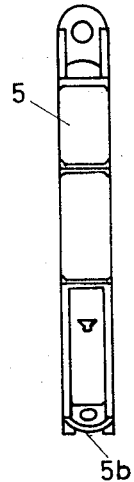
FIG. 4 is a right-side view of the fastener.

In this case, inside the hollow interior of each channel-shaped fastener is provided a resilient packing or sealing ring 9 (for example, rubber or soft plastic resin) with several steel balls 8 being distributed at equal intervals along its circumference. As is apparent from FIG. 5, groups of four steel balls 8 are situated in a plurality of radial planes which are equidistant from each other with one of the groups being shown in FIG. 5. Thus, each group of four steel balls 8 includes an outer pair aligned with the flanges 3b and 4b so as to reinforce the sealing ring 9 against radial pressure directed outwardly toward the fastener means 5. Each group of four steel balls 8 also includes a pair of lateral balls 8 between which the flanges 3b and 4b are located so that the sealing ring 9 is reinforced by these lateral balls 8 against angular forces resulting from the angular position of the surfaces of the flanges 3b and 4b where they engage each other. Thus, the fluid under pressure will tend to expand the flanges 3b and 4b outwardly and will also tend to displace these flanges angularly, and these latter forces are resisted by the location of the balls 8 in the sealing ring 9 as shown in FIG. 5. Further, a stainless or other sheet cover plate 10 is fitted between band 5 and packing 9 in the flange-to-flange connecting portion to prevent packing 9 from being dismantled.

Next, referring to the function of the structure, for instance, tighten temporarily nut 7 onto bolt 6 to such an extent that flanges 3a and 4a of semi-spherical couplings 3 and 4 can be turned to flanges 1a and 2a of two pipes 1 and 2 extending vertically by way of packing 9, cover plate 10, flange 5, bolts 6 and nuts 7, and after turning both semi-spherical couplings 3 and 4 so that slant flanges 3b and 4b of both semi-spherical couplings 3 and 4 can contact each other in parallel, put packing 9 and cover plate 10 on slant flanges 3b and 4b, then fit projection 5a into groove 5b at the end of housing 5, finally tighten both fastener band by means of bolt 6 and nut 7. In this case, when tightening firmly the temporarily tightened bolt 6 and nut 7 between pipe 1 or 2 and semi-spherical coupling 3 or 4, then the load of the pipe and fluid under pressure therein is to be imposed upon several steel balls 8 which are distributed at an equal intervals inside packing 9, and, as a consequence, it will prevent a permanent deformation of packing 9 and can bring leak-proof effect to perfection.

In other words, in accordance with the invention, the pipe connecting device enables an angle at a connecting portion to be determined as desired, so that it can easily be availed of at any portion, whether it be a straight portion or curved one, and yet it requires no more space as compared with conventional bent pipe. Especially, if this invention is utilized in a bent pipe connection, a connecting portion will form a perfect sphere, so that it will result in soften-ing an initial water-hammering of gas or fluid flowing in pipe. In short, in accordance with the invention, the result is simplifying piping work extremely, and shortening working time to a great extent, thus increasing actual profit and decreasing engineering cost extensively.

I claim:

1. In a pipe connection, a pair of hollow hemispherical bodies respectively having openings for pipe connections and circular ends of equal diameter engaging each other and respectively having outwardly directed flanges at said engaging ends, and fastener means surrounding said bodies for releasably fastening them to each other, said fastening means including a circular fastener band of channel-shaped configuration having a hollow interior in which said flanges are located, and a sealing ring of yieldable material completely filling said hollow interior of said band and engaging and surrounding said flanges, said sealing ring having metal reinforcing balls embedded therein and situated at predetermined locations in said sealing ring, said reinforcing balls being distributed in groups each of which is located in a radial plane with the latter planes being equidistantly situated circumferentially along said flanges, with four balls at each of said planes, each group of four balls including a pair of outer balls situated radially beyond and respectively in alignment with said flanges for radially reinforcing said sealing ring with respect to outwardly directed radial forces and a pair of lateral balls between which said flanges are located for angularly reinforcing said sealing ring with respect to angular forces.

* * * * *